US005725935A

United States Patent [19]

Rajan

[11] Patent Number: 5,725,935

[45] Date of Patent: Mar. 10, 1998

[54] SIGNAGE ARTICLES AND METHODS OF MAKING SAME

[75] Inventor: J. Sundar Rajan, Woodbury, Minn.

[73] Assignee: Minnesota Mining and Manufacturing Company, St. Paul, Minn.

[21] Appl. No.: 720,266

[22] Filed: Sep. 26, 1996

Related U.S. Application Data

[63] Continuation of Ser. No. 335,468, Nov. 7, 1994, abandoned.

[51] Int. Cl.[6] .............................. B32B 3/00; B32B 21/14

[52] U.S. Cl. .......................... 428/195; 428/72; 428/323; 428/406; 428/407; 428/412; 428/423.1; 428/457; 428/488.1; 428/500; 428/524; 428/537.5

[58] Field of Search .................................... 428/195, 323, 428/406, 407, 423.1, 457, 480, 500, 524, 537.5, 72, 412, 451, 488.1

[56] References Cited

U.S. PATENT DOCUMENTS

| | | |
|---|---|---|
| Re. 24,906 | 12/1960 | Ulrich . |
| 2,407,680 | 9/1946 | Palmquist et al. . |
| 2,684,301 | 7/1954 | Mayo . |
| 3,190,178 | 6/1965 | McKenzie . |
| 3,684,348 | 8/1972 | Rowlan . |
| 3,857,731 | 12/1974 | Merrill, Jr. et al. . |
| 4,025,159 | 5/1977 | McGrath . |
| 4,311,723 | 1/1982 | Magrauer . |
| 4,644,966 | 2/1987 | Bailey et al. . |
| 4,714,656 | 12/1987 | Bradshaw et al. . |
| 4,758,952 | 7/1988 | Harris, Jr. et al. . |
| 4,767,659 | 8/1988 | Bailey et al. . |
| 4,801,193 | 1/1989 | Martin . |
| 4,840,863 | 6/1989 | Otsu et al. . |
| 4,844,976 | 7/1989 | Huang . |
| 4,895,428 | 1/1990 | Nelson et al. . |
| 4,896,943 | 1/1990 | Tolliver et al. . |
| 4,938,563 | 7/1990 | Nelson et al. . |
| 4,959,265 | 9/1990 | Wood et al. . |
| 4,966,829 | 10/1990 | Yasuda et al. . |
| 5,064,272 | 11/1991 | Bailey et al. . |
| 5,066,098 | 11/1991 | Kult et al. . |
| 5,085,918 | 2/1992 | Rajan et al. . |
| 5,266,432 | 11/1993 | Hayashi et al. . |
| 5,286,544 | 2/1994 | Graham . |
| 5,294,490 | 3/1994 | Sasaki et al. . |

FOREIGN PATENT DOCUMENTS

| | | |
|---|---|---|
| 0 309588 A1 | 4/1989 | European Pat. Off. . |
| 0424131 A1 | 4/1991 | European Pat. Off. . |
| 0 457 544 | 11/1991 | European Pat. Off. ......... G03G 7/00 |
| 0 501 403 | 9/1992 | European Pat. Off. ....... G03G 13/16 |
| 3515191 | 11/1985 | Germany . |
| 3714288 | 11/1985 | Germany . |
| 60-115958 | 10/1985 | Japan ............................ G03G 15/01 |
| 2126389 | 3/1984 | United Kingdom . |

OTHER PUBLICATIONS

Tack Testing, Handbook of Adhesives, 3rd Edition, 1990, pp. 656–657.

(List continued on next page.)

*Primary Examiner*—William Krynski
*Attorney, Agent, or Firm*—Peter L. Olson; Robert H. Jordan; Douglas B. Little

[57] ABSTRACT

The present invention discloses signage articles having a layer of fused dry toner powder which is fused by employing a tacky pressure-sensitive adhesive and low compression. Suitable tacky pressure-sensitive adhesives include alkyl acrylate polymers or copolymers, alkyl vinyl ether polymers or copolymers, polyisobutylene, polybutadiene, and butadiene-styrene copolymers. Such signage articles further comprise a transparent cover layer disposed over the fused dry toner powder-bearing surface. Also disclosed are methods of forming signage articles, one method comprising the steps of applying dry toner powder to a first substrate surface, applying a composition including a tacky pressure-sensitive adhesive to a second substrate surface, and laminating the two substrates to admix the dry toner powder and the tacky pressure-sensitive adhesive. Either the first or second substrate may be the transparent cover layer of the resulting signage article.

18 Claims, 2 Drawing Sheets

OTHER PUBLICATIONS

Triboelectric Charging Properties of Organic Color Pigments, H.T. Macholdt & A. Sieber, J. Imaging Technology 14:89–93 (1988).

The Theory & Practice of Corona Treatment for Improving Adhesion, R.H. Cram & D. V. Bibee, Tappi, vol. 65 #8, Aug. 1982, pp. 75078.

Tack, F. H. Hammond, Jr. Handbook of Pressure–Sensitive Adhesive Technology, VanNostrand Reinhold Company, 1982, pp. 32–49.

3M Brochure for LBQ Printing System, 1988.

Patent Abstracts of Japan, The Patent Office Japanese Government, Apr. 26, 1989, vol. 13, No. 177 (M–818).

Vynathene EY 902–30 Spec Sheet, By Quantum, dated Jun. 1993.

Piccotex Resin #7174–6 By Hercules Incorporated, dated Oct. 1990.

Regalrez 108 and 1085 Resings #7369–2 By Hercules Incorporated, dated.

Pressure–Sensitive Tack of Adhesives, American Society for Testing and Materials, Test No. D1878–61T, 1961.

HP Laser Jet 4 and 4M Printers User's Manual, HP Part No. C2001–90912, First Edition, Oct. 1992.

Laser Printing Systems, Aug. 1988 Edition.

Laser Jet IIp Printer User's Manual, HP Part No. 33471–90901 First Edition, Jun. 1989.

The Characterization of Pressure Sensitive Adhesives, Frank Wetzel, ASTM Bull. No. 221,64 (Apr. 1957) pp. 64–68.

Tutorial: Dry Toner Fundamentals by T.I. Martin, Imaging Materials Seminar Series, Seventh Annual Toner & Developer Industry Conference dated Sep. 1990.

SIGNAGE ARTICLES AND METHODS OF MAKING SAME

This is a continuation of application Ser. No. 08/335,468 filed Nov. 7, 1994, now abandoned.

A microfiche appendix is included in this application showing certain computer software. The appendix comprises one microfiche with 73 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates to signage articles. In particular, the invention relates to low temperature formation of indicia using dry toner powder.

2. Related Art

Dry toner powder is known for printing on paper and other substrates, and compositions of dry toner powders are described in, for example, U.S. Pat. No. 5,085,918. Typically, dry toner powders comprise a colorant and a binder, and optionally a charge carrier and flow control additive. The binder is a non-tacky solid at room temperature, but melts or softens sufficiently to permanent fusion of the composition and adherence to the substrate at temperatures ranging from about 120°–240° C.

Various methods are known in the art for applying dry toner powder onto a substrate to form indicia. One method is to apply dry toner powder electrophotographically, wherein a charge carrier is added to the composition. In this method, a laser is used to alter the electrostatic charge on a portion of the surface of a rotating drum to form a latent image. Portions defined by the latent image accept dry toner powder from a reservoir. The rotating drum then transfers the dry toner powder in the desired image definition to a substrate contacting or nearly contacting the rotating drum. The laser can be controlled to form indicia that are generated in digital form by a computer, either directly by a computer operator, reproduced from data stored in digital form, or from an optically scanned and digitized image. Such electrophotographic imaging is commonly used in copy machines and laser printers.

After transferring dry toner powder from the rotating drum to a substrate, forming a desired image, the applied dry toner powder is fused to fix the image in place. The process of fusing involves converting the particles of dry toner powder in the transferred image to a continuous phase in which discrete particles are no longer present. Fusing aids in keeping toner within the intended edges of the image and in forming an image of acceptable quality. Dry toner powder generally is fused or fixed on a substrate by heating the dry toner powder to a temperature in the range of about 200° to about 220° C. for approximately 0.1 seconds, although temperatures approaching 220° C. typically are required to obtain satisfactory image quality.

For example, the '918 patent describes articles wherein the substrate onto which the dry toner powder is transferred in the form of a desired image is retroreflective signage, wherein the dry toner powder is fused to form the image through a high temperature process. Optionally, there is disclosed a clear polymeric film formed over the image bearing surface of the signage articles, e.g., by dip coating or laminating, to provide a protective coating.

HP Laser Jet 4 and 3M Printers User's Manual (First Edition: October, 1992) and HP Laser Jet IIP Printer User's Manual (First Edition: June, 1989) indicate that substrates, as well as pigments and other components of which the substrate is comprised, must be able to tolerate fusing temperatures in excess of 200° C. for at least 0.1 seconds without physical or chemical deterioration. Similarly, Siemens Nixdorf Electronic Printing Systems Manual (January, 1992 Edition) states that pigments and substrates must be able to tolerate temperatures of at least 200° C. at a pressure of $2.4\times10^5$ Pascals (Pa). Fusing at such temperatures and pressures limits the composition of substrates to which dry toner powder can be applied since a substrate must tolerate the temperatures used for fusing without noticeable chemical or physical degradation.

In attempting to develop additional processes for fusing of dry toner to a substrate, high pressure, in the range of about 14 megaPascals (MPa) to about 28 MPa (2000 to 4000 psi), has been used to achieve fusion at lower temperatures. Toward that end, an ideal dry toner fusion process would require no machine warm-up time, a minimum power input and reduced fuser roll degradation. Unfortunately, the fusing pressures, such as those indicated above, required for adequate print quality cause considerable compressive damage to the substrate. This type of damage results, for example, in the calendering of paper, and an unsatisfactory glossy appearance.

Numerous attempts have been made to utilize a noncontact fusing technology where no surface touches the dry toner powder side of the paper until fusing is complete. For example, unfused dry toner powder may be exposed to solvent vapors which soften the binder in the dry toner powder and thus accomplish fusing, for example, as disclosed in U.S. Pat. No. 2,684,301 (Mayo). U.S. Pat. No. 4,311,723 (Mugraner) also discloses a vapor fusing system that utilizes a trichlorotrifluoroethane and either acetone or methylene chloride in an azeotropic mixture.

Fusing dry toner powder at high temperatures or at high pressures also imposes the additional requirement of complex equipment that is capable of exerting uniform heat or pressure upon the substrate surface. On the other hand, fusing dry toner powder to a substrate by solvent vapors is limited to substrates that would not be damaged by the chemical action of the solvents, and necessitates the additional processing step of passing the substrate through a chamber containing the solvent vapors. Furthermore, the use of solvent vapors is likely to have undesirable environmental consequences, and printing mechanisms using such chemically-based fusing processes may, in turn, be subject to significant regulation relating to release of the solvents into the atmosphere.

Thus, there exists a need to provide a low-temperature, low-pressure, solvent-free chemical fusion process that is relatively simple and economical to implement.

SUMMARY OF THE INVENTION

In accordance with the present invention, signage articles and methods of making same are presented which overcome some of the limitations of previously known articles and methods. One aspect of the invention is a signage article comprising:

a) a first substrate having first and second major surfaces;

b) a fused dry toner powder (preferably in the form of a computer-generated image) adhered to the first major surface of the first substrate, the fused dry toner powder comprised of a colorant and a binder, the binder comprising a combination of first and second adhesives, the first adhesive being non-tacky at 25° C., the second adhesive being aggressively tacky at 25° C.;

c) a second substrate adhered by an adhesive layer to the fused dry toner powder and first surface of the first substrate, the adhesive layer comprising a major portion of the second adhesive, at least one of the first or second substrates being transparent. As used herein "fused dry toner powder" comprises two binding adhesives. As used herein "transparent" means transmitting at least 90% of incident light in the visible electromagnetic spectrum (about 400–700 nanometers), as determined using a standard spectrophotometer.

Alternatively, the fused dry toner powder may be adhered to the second substrate rather than to the first surface of the first substrate, or to both the first and second substrates.

In more specific terms, the signage articles of the invention preferably comprise:

a) a liner;

b) a first adhesive layer having first and second major surfaces, the first surface removeably adhered to the liner;

c) a plastic film layer having first and second major surfaces, the plastic film layer coterminous with and the first adhesive layer, the first major surface of the plastic film layer adhered to the second major surface of the adhesive layer;

d) a retroreflective layer having first and second surfaces, wherein the first surface of the retroreflective layer is preferably defined by a plurality of concavities, a first portion of the concavities filled with and adhered to the second major surface of the plastic film layer, a second portion of the concavities not filled with or adhered to the second major surface of the plastic film layer, the second surface of the retroreflective layer being substantially smooth;

e) a plurality of areas of fused dry toner powder adhered to the second surface of the retroreflective layer, the fused dry toner powder comprised of a colorant and a binder, the binder comprised of first and second adhesives, the first adhesive being non-tacky at about 25° C., the second adhesive being transparent and aggressively tacky at 25° C.; and f) an optional transparent protective layer adhered by a second adhesive layer to the fused dry toner powder and second surface of the retroreflective layer, the second adhesive layer comprising a major portion of the second adhesive (this layer only required in outdoor signage articles).

Preferred inventive articles are those wherein the concavities of the retroreflective layer are defined by cube-corner elements, for example, when the retroreflective layer comprises a laminate of polymethylmethacrylate (PMMA) sheeting and a polycarbonate layer, the PMMA sheeting forming the smooth surface, the polycarbonate layer forming a plurality of geometric projections having at least two planar facets, and thus defining the plurality of concavities. Further, the first and second adhesive layers are preferably the same and comprise a tacky copolymer of a major portion of isooctyl acrylate and a minor portion of acrylic acid, and the dry toner powder adhesive is a non-tacky acrylate. Preferred tacky copolymers are those which comprise about 95.5 weight percent of isooctyl acrylate and about 4.5 weight percent of acrylic acid. The transparent protective layer preferably comprises a copolymer of ethylene and acrylic acid or PMMA, polyurethane, and the like.

Another aspect of the invention are methods of making the signage articles of the invention. One inventive method, wherein the dry toner powder and the tacky adhesive are applied to the same layer, comprises the steps of:

(a) providing a first substrate having a first major surface;

(b) applying a dry toner powder composition to at least a portion of the first major surface of the first substrate, the dry toner powder composition comprising a colorant and a first adhesive which is non-tacky at about 25° C.;

(c) applying over the dry toner powder composition and first major surface of the substrate a coatable composition comprising a second adhesive, the second adhesive being transparent and agressively tacky state at about 25° C., thus forming a tacky adhesive layer;

d) applying a second substrate over the coatable composition, at least one of the first and second substrates being transparent, thus forming an intermediate article; and e) applying sufficient compression to the intermediate article to fuse the dry toner powder composition.

Preferably, the dry toner powder composition is applied in the form of indicia, such as alphanumeric symbols formed by a computer program, but this is not required. In fact, the dry toner powder composition may be applied to the entire surface of one of the substrates.

Alternatively, the dry toner powder composition may be applied to a protective layer, and the adhesive layer applied thereover, followed by application of the substrate. Another alternative is to first apply dry toner powder composition and then the coatable composition comprising the tacky adhesive to a protective layer, followed by pressing the together the tacky adhesive-coated protective layer having dry toner powder therein with a substrate which previuosly had the same or different dry toner powder applied thereto.

Further aspects and advantages of the invention will become apparent after reviewing the brief description of the drawing figures and description of preferred embodiments which follow.

Figure 1:
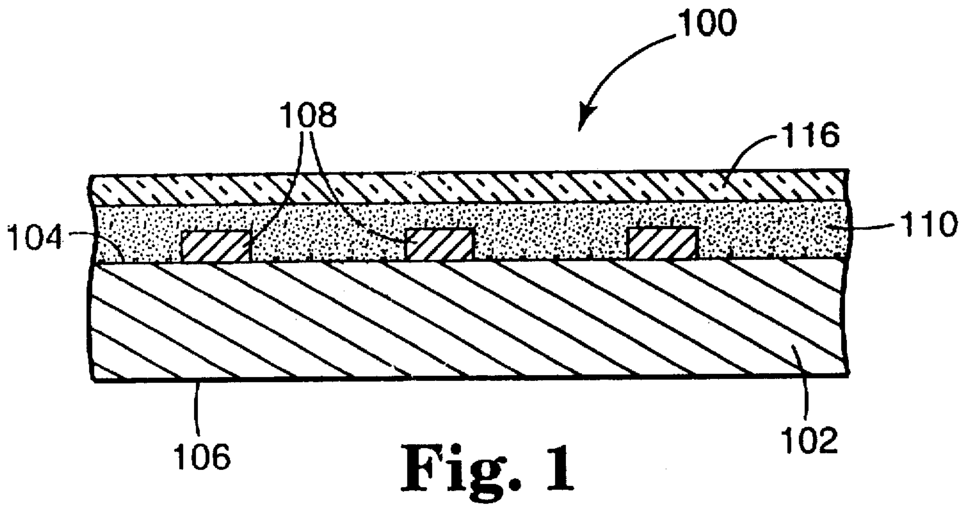
FIG. 1 is a cross section view (enlarged) of a portion of a first signage article embodiment according to the invention.

These figures are not to scale and are only illustrative of the invention.

DESCRIPTION OF PREFERRED EMBODIMENTS

1. Tacky Pressure Sensitive Adhesives

The present invention is based on the discovery that dry toner powder, comprising a non-tacky adhesive, can be effectively fused at a temperature ranging from about 20° C.

to about 125° C. (more preferably at about 25° C.) and pressure ranging from about 250 to about 1500 kiloPascals (kPa), preferably about 690 to about 1380 kPa (depending on the temperature and time at temperature and pressure), onto a substrate surface by use of an aggressively tacky pressure-sensitive adhesive (PSA).

As used herein the term "fused" means that when viewed under a microscope at 40× magnification, no dry toner powder particles are present in the image, and preferably no dry toner particles are seen at 70× magnification.

Tack refers to "the property of a material which enables it to form a bond of measurable strength immediately on contact with another surface." (American Society for Testing and Materials (ASTM) test no. D1878-61T, ASTM Bull. No. 221,64 (1957)). A common tester used by ASTM is a Polyken probe tack tester, which, according to Handbook of Adhesives, 3rd Ed. p. 656(1990), comprises a 5 millimeter diameter flat-ended rod (usually steel) connected to a load cell. The instrument mechanically lifts the probe to make contact with the PSA, holds it there for a preset time of contact, variable in 10 steps from 0.1 to 100 seconds, and then withdraws the probe at a controlled speed, which can be varied in steps from 0.02 to 2 cm/sec. The PSA, on some backing, is attached to the flat bottom of an inverted metal cup with a hole in the bottom through which the probe enters. Thus, the contact pressure can be varied using by using cups or annular weights of various masses. The most common test conditions reported are 100 g/cm contact pressure, 1 second contact time, and 1 cm/sec withdrawal speed (commonly denoted using the shorthand notation 100, 1, 1).

Experimental values of Polyken probe tack are expressed in terms of gram force, with all conditions specified. In the present invention, the phrases "tacky" and "aggressively tacky" are used interchangeably and mean the PSA in question has a probe tack as measured in accordance with ASTM D 1878-61T of at least 500 g (100, 1, 1), preferably at least 1000 g, while the term "non-tacky" means having a tack of at most 400 g (100, 1, 1).

Tacky PSAs useful in the invention also may be characterized by having "180° peel adhesion" ranging from about 170 to about 1000 gm/cm, more preferably ranging from about 390 to about 560 gm/cm, measured using a standard test procedure. In this procedure, the force necessary to remove (i.e. peel) a PSA-coated substrate from a test substrate when the PSA-coated substrate is peeled from the test substrate is termed the "peel adhesion" value. A standard glass plate is cleaned using a solvent (such as one wash of diacetone alcohol followed by three washes of n-heptane). With very light tension, a sample having a PSA-backsize coating is then applied along the center of the standard glass plate, PSA side down. The sample is then rolled once with a 2.04 Kg hand roller. The standard glass plate is then secured to a horizontal platen in a standard peel adhesion tester such as that known under the trade name "IMASS." One end of the sample is then attached to a hook which is a part of the peel adhesion tester. The sample is peeled from the standard glass plate at a 180° angle (i.e., one end of the sample is pulled toward the other end) by moving the platen horizontally at a speed of 228.6 cm/min (90 in/min), and the force required recorded, in gm/cm of sample width, for various dwell times.

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in terms of time (in minutes) required to pull a standard area of adhesive coated sheet material from a stainless steel test panel under stress of a constant, standard load. The tests are conducted on adhesive coated strips applied to a stainless steel panel such that a 12.5 mm by 12.5 mm portion of each strip is in firm contact with the panel with one end portion of the tape being free. The panel with coated strip attached is held in a rack such that the panel forms an angle of 178° with the extended tape free end which is then tensioned by application of a force of one kilogram applied as a hanging weight from the free end of the coated strip. The 2° less than 180° is used to negate any peel forces thus insuring more accurate determination of the holding power of the tape being tested. The time elapsed for each tape example to separate from the test panel is recorded as the shear strength. Internal cohesive strength (shear strength) of useful tacky PSAs can range from about 1 minute to over 10,000 minutes.

The use of aggressively tacky PSAs for low-temperature, low-pressure fusion of dry toner powder can provide process and product advantages normally only achieved with materials or processes that allow wetting out or solubilizing of the dry toner powder onto a substrate. For example, a PSA can effectively fuse a dry toner powder at low temperatures, temperatures as low as room temperature (about 25° C.). One advantage of the methods of the present invention is that dry toner powder may conveniently be fused on a wider variety of substrates than previously possible, particularly those substrates that do not tolerate high temperature fusing processes. Such substrates include, for example, delicate composite materials, and retroreflective sheeting materials.

A first embodiment 100 of an article prepared according to one method of the present invention is illustrated schematically in cross section (enlarged) in FIG. 1. Article 100 comprises a substrate 102, having a first surface 104 and a second surface 106. A transparent adhesive layer 110, comprising an aggressively tacky PSA, is substantially continuously bonded to first surface 104, interspersed by those portions that are adjacent to a fused dry toner layer 108. Fused dry toner layer 108 is adhered directly to surface 104 in this embodiment and comprises fused dry toner powder that is at least partially solubilized or wetted by the aggressively tacky PSA in adhesive layer 110. Article 100 further comprises a protective layer 116 that is adhered to adhesive layer 110. In article 100 illustrated in FIG. 1, layer 116 is a transparent cover film. Fused dry toner layer 108 preferably forms indicia that are visible to an observer through transparent cover film layer 116 and adhesive layer 110 against the background of substrate surface 104.

Useful Tacky PSAs are typically and preferably aggressively and permanently tacky at room temperature, adhere to substrates without the need for more than hand pressure, and require no activation by water, solvent or heat.

Tacky PSAs useful in the present invention are selected from the group consisting of alkylacrylate polymers and copolymers; copolymers of alkylacrylates with acrylic acid; terpolymers of alkylacrylates, acrylic acid, and vinyl-lactates; alkyl vinyl ether polymers and copolymers; polyisoalkylenes; polyalkyldienes; alkyldiene-styrene copolymers; styrene-isoprene-styrene block copolymers; polydialkylsiloxanes; polyalkylphenylsiloxanes; natural rubbers; synthetic rubbers; chlorinated rubbers; latex crepe; rosin; cumarone resins; alkyd polymers; and polyacrylate esters and mixtures thereof. Examples include polyisobutylenes, polybutadienes, or butadiene-styrene copolymers, and mixtures thereof (such polymers and copolymers preferably have no reactive moieties, i.e., are not oxidized in the presence of air); silicone-based compounds such as polydimethylsiloxane, and polymethylphenylsiloxane combined with other resins and/or oils.

Useful tacky PSAs also include tackified thermoplastic resins and tackified thermoplastic elastomers, wherein the tackifier comprises one or more compounds which increases the tack of the composition. An example of a tackified thermoplastic resin useful as an aggressively tacky PSA is the combination of a vinyl acetate/ethylene copolymer known under the trade designation VYNATHENE EY 902-30 (available from Quantum Chemicals, Cincinnati, Ohio) with substantially equal portions of the tackifiers known under the trade designations PICCOTEX LC (a water-white thermoplastic resin produced by copolymerization of vinyltoluene and alpha-methylstyrene monomers having a ring and ball softening point of about 87°–95° C., available from Hercules Incorporated, Wilmington, Del.) and WINGTACK 10 (a liquid aliphatic C-5 petroleum hydrocarbon resin available from Goodyear Chemical) and an organic solvent such as toluene. An example of a tackified thermoplastic elastomer useful as an aggressively tacky PSA is the combination of the styrene-poly(ethylene-butylene)-styrene block copolymer known under the trade designation KRATON G1657 (available from of Shell Chemicals) with one or more of the low molecular weight hydrocarbon resins known under the trade designation REGALREZ (from Hercules) and an organic solvent such as toluene. Both of these formulations may be coated using a knife coater and air dried, or air dried followed by oven drying. Of course, the invention is not limited to use of these specific combinations of thermoplastic resins, thermoplastic elastomers, and tackifiers.

The presently preferred PSA's, because of their extended shelf life and resistance to detackifying under atmospheric conditions, are acrylic-based copolymer adhesives as disclosed in U.S. Pat. No. Re 24,906. One example of such an acrylic-based copolymer is a 95.5:4.5 (measured in parts by weight of each) isooctylacrylate/acrylic acid copolymer. Another preferred adhesive is the copolymer of a 90:10 weight ratio combination of these two monomers. Yet other preferred adhesives are terpolymers of ethyl acrylate, butyl acrylate, and acrylic acid; copolymers of isooctylacrylate and acrylamide; and terpolymers of isooctylacrylate, vinylacetate, and acrylic acid.

Tacky acrylic PSAs useful in the invention can be coated out of a coatable composition comprising an organic solvent, such as a heptane:isopropanol solvent mixture, and the solvent subsequently evaporated, leaving a pressure-sensitive adhesive coating. Layer 110 is preferably from about 0.038 centimeters (cm) to about 0.11 cm (5 to 15 mils) thick when the substrate is a retroreflective sheeting material.

2. Dry Toner Powder

When viewed under a microscope, for example, at 40×, preferably 70× magnification, fused dry toner powder present in fused dry toner layer 108 (FIG. 1) appears continuously distributed within the boundaries of the layer, and few, if any, discrete particles of dry toner powder are visible. This is evidence that fused dry toner layer 108 is sufficiently fused by ingredients in the adhesive layer 110 so that the boundaries between discrete powder particles are reduced or eliminated; in such a condition the dry toner powder is considered to be fusibly admixed. However, it should be noted that microscopic examination indicated that chemical fusion of dry toner powder present in fused dry toner layer 108 did not result in migration of the dry toner powder throughout the adhesive layer, i.e., there is no unintended blurring of images formed by fused dry toner layer 108.

The basic characteristics of dry toner powders are known and described in, for example, T. I. Martin, *Tutorial: Dry Toner Fundamentals*, Imaging Materials Seminar Series, Seventh Annual Toner & Developer Industry Conference (Sep. 16–18, 1990). See also coassigned U.S. Pat. No. 5,085,918. Dry toner powders generally are non-toxic, have excellent flow characteristics, are stable during storage and have high transfer efficiency. Dry toner powder compositions include colorants and normally non-tacky binder adhesives which become tacky only at elevated temperatures (i.e. much above ambient). Other optional additives can be included in a dry toner powder to adjust properties of the toner, e.g., charge control agents, magnetic additives, bulk additives, surface additives and conductive additives.

The preferred dry toner powder binding adhesives are characterized by relatively high transparency and clarity. Additionally, preferred binding adhesives have glass transition temperatures ($T_g$) from about −15° C. to about 150° C., preferably from about 35° C. to about 110° C., and most preferably about 50° C. The most preferred dry toner powder binding adhesives are chosen based upon their potential strong chemical interactions with the surface to be printed. Specifically envisioned as factors to be considered as providing the potential for strong chemical interactions are the likelihood of formation of bonds such as ionic or covalent bonds, donor-acceptor bonds, as well as secondary bonds such as hydrogen bonds and van der Waals bonds between the dry toner powder binding adhesive and the surface to be printed. In evaluating the potential, the relevant bond energies may be obtained from textbooks such as *Adhesion and Adhesives: Science and Technology* by A. J. Kinloch; 1987, University Press Cambridge, Great Britain.

Additionally, the most preferred dry toner powder binding adhesives can be laminated, when incorporated in a dry toner powder, at temperatures of from about 20° C. to about 125° C., preferably at room temperature (about 25° C.). For example, the well known REFLECTO-LITE brand retroreflective sheeting available from the Minnesota Mining and Manufacturing Company of St. Paul, Minn., has a polyvinyl butyral surface and therefore compatible binding agents, which cause dry toner powders to laminate at temperatures from about 20° C. to about 125° C., may be fused during lamination of an ethylene acrylic acid (EAA) copolymer protective film to the retroreflective sheeting. Laminating temperatures refer to those measurable at the surface of lamination rollers. Temperatures at surfaces being laminated may be lower than the laminating temperatures mentioned here. Most preferred are binding adhesives which may be used at temperatures of about 25° C. Preferred dry toner powder binding adhesives are also resistant to ultraviolet (UV) light degradation and are adhesive to the surface upon which the toner is printed.

Dry toner binder adhesives must function dually in that they must allow the dry toner powder to flow easily as a powder, and must melt at temperatures within a temperature ranging from about 20° C. to about 125° C. They also are preferably compatible with a wide variety of tacky PSAs. A large variety of compounds can serve as dry toner powder binding adhesives, including, but not limited to, polymers in the general classes of polyesters, epoxies, polyalkylacrylates, polyalkylmethacrylates, polyurethanes, cellulose esters, polycarbonates, polyolefins, polyvinyl acetals, fluorine-containing polymers, thermoplastic elastomers such as ionomers and ionomeric copolymers, copolymers of styrene with n-butylmethacrylate, n-butylacrylate, or butadiene, and copolymers of ethylene or propylene and vinylacetate, acrylic acid or methacrylic acid.

A suitable non-tacky dry toner powder binding adhesive may be an alkyl substituted acrylate or methacrylate polymer, with alkyl groups having from 1 to 9 carbon atoms, or mixtures of such acrylates and especially a copolymer of methyl and butyl methacrylates (such as for example, those known under the trade designations ACRYLOID B-66 and ACRYLOID B-48 available from Rohm & Haas Company). Other suitable non-tacky binding adhesives are polyvinyl acetals, for example, polyvinyl butryal (such as BUTVAR brand polyvinyl butryals B-90 or B-72 available from the Monsanto Chemical Company); polyolefins; polyesters (such as VITEL brand PE-200D from the Goodyear Tire & Rubber Company or ARAKOTE 3000 brand carboxyl terminated polyester optionally in mixture with ARAL-DITE PT810 brand polyfunctional epoxy resin (triglycidyl isocyanurate) both available from the Ciba-Geigy Chemical Company; and vinyl resins (such as VINYLITE brand vinyl resin VAGH, a copolymer of vinyl chloride and vinyl acetate available from the Union Carbide Corporation).

3. Charge Carriers

Suitable charge carriers may be positive or negative charge control agents designed for use as additivies in dry toner powder formulations, depending on the type of printer used. Examples of positively charged control agents include copolymers of butyl and methyl methacrylate (such as TRIBLOX PC-100 brand acrylic polymer (available from E. I. DuPont de Nemours Company)). An example of a suitable negatively charged control agent is that known under the trade designation T-77, from Hodogaya Chemical Co. Ltd. Tokyo (JP), which is an azo-dye metal complex (black). Another useful negatively charged carrier is COPY CHARGE NX VP 434 (quaternary ammonium salt) from Hoechst-Celanese which is colorless. Another useful colorless, negatively charged carrier is BONTRON E-82 (a metal complex of an alkyl derivative of salicylic acid) from Orient Chemical Co., Port Newark, N.J. Polyesters and vinyl resins may also be used as charge carriers. A preferred acrylic copolymer charge carrier has the following characteristics: molecular weight ranging from about 2000 to 5000; glass transition temperature ($T_g$) ranging from about 53° C. to 59° C., onset at about 46° C., nitrogen content of about 1% as measured by NMR. Preferred charge carriers are also relatively light transmissive or transparent materials, and are resistant to UV light degradation. For a black dry toner powder, a transparent charge carrier is not essential. For example, an azine dye (Nigrosine Solvent Black 7, CI#50415:1) available from Orient Chemical Co., may be used as a charge carrier for such a toner. The most preferred charge carriers are acrylic polymers (i.e. alkyl acrylates or alkyl methacrylates) having amine functionality (i.e. functional groups including amine nitrogen or quaternary ammonium nitrogen).

Suitable colorants may be pigments such as PIGMENT RED 179 or 224 available from the Harmon-Mobay Chemical Company; PIGMENT YELLOW 110 or PIGMENT VIOLET 37 available from the Ciba-Geigy Company; PIGMENT GREEN 7 or 36 available from the Sun Chemical Company; the colorant known under the trade designation PIGMENT BLUE 15;1 or BLUE 15;6 available from BASF; the colorant known under the trade designation REGAL 500R (carbon black) available from Cabot Corporation; the colorant known under the trade designation HELIOGEN BLUE K6911D (available from BASF); and the colorant known under the trade designation PROJET 900MP (available from ICI Ltd.) (the latter sometimes used primarily for infrared absorption). Suitable colorants may also be dyes such as that known under the trade designation AMAPLAST YELLOW available form the Color-Chem International Corporation or LATYL BRILLIANT BLUE BGA available from the DuPont Company. Generally, pigments or dyes should be resistent to environmental pollutant chemical degradation and UV light degradation. Preferably, pigments are dispersed in a dispersing resin, for example RED 229 dispersed in an acrylic resin known under the trade designation ACRYLOID B-66 in a 1:3 weight ratio. Such dispersion helps to maintain the small pigment particle size that is desired for obtaining a light transmittant image.

The fused dry toner powder on retroreflective signs is preferably light transmissive for all colors except black. That is, at least 10% of light entering the fused dry toner area passes through the fused dry toner powder, except in the case of carbon black. In the case, however, of black images resulting from the use of carbon black, the fused dry toner powder is preferably opaque. That is, none of the light entering the black area passes through the fused dry toner powder.

Suitable dry toner powders may be prepared by combining from about 64 percent to about 98 percent non-tacky binding adhesive, about 1 percent to about 20 percent charge carrier agent and about 1 percent by weight to about 16 percent colorant; preferably combining from about 76 percent to about 92 percent non-tacky binding adhesive with about 2 percent to about 12 percent charge carrier agent and with about 6 percent to about 12 percent colorant; and most preferably combining about 88 percent binding adhesive with about 4 percent charge carrier agent and about 8 percent colorant, all percentages in weight percent of the total weight of dry toner powder composition.

4. Applying Dry Toner Powder to Substrates

The non-tacky binding adhesive, colorant, and optional charge carrier agent (required for electrophotographic printing) and other optional ingredients may be mechanically mixed (and the binding adhesive as well as the charge carrier melted) using a twin screw extruder such as a variable speed twin screw extruder, for example a Baker Perkins gear drive model having a Haake rheocord torque rheometer. Preferably, the twin screw extruder generates a temperature of approximately 150° C. to approximately 225° C. during extrusion. The extruded product may be hammermilled and then jet milled to generate a mixture having particle sizes ranging from about 5 to 100 micrometers, preferably from about 5 to 50 micrometers and most preferably from about 5 to about 20 micrometers. A suitable jet mill is NPA Supersonic Jetmill model PJM IDS-2 available from the Nippon Pneumatic Manufacturing Company. The resulting material may be used in the toner hopper of a laser type printer.

Suitable surfaces to be printed may be made from materials including polymers selected from the group consisting of polyalkylacrylates, polyalkylmethacrylates, polyesters, vinyl polymers, polyurethanes, cellulose esters, fluoropolymers, polycarbonates, polyolefins, ionomeric copolymers and copolymers of ethylene or propylene with acrylic acid, methacrylic acid, or vinyl acetate. Suitable retroreflective sheeting substrates include those known under the trade designations SCOTCH-LITE brand HIGH INTENSITY retroreflective sheeting and REFLECTO-LITE brand retroreflective sheeting. The surface layers of such substrates may be made of polyalkylacrylates or polyalkylmethacrylates (especially polymethyl methacrylate (PMMA)), polyesters, vinyl polymers and polyvinyl acetals such as, for example, polyvinyl butryals. The SCOTCH-LITE brand and REFLECTO-LITE brand retroreflective sheetings are available from the Minnesota Mining and Manufacturing Company, St. Paul, Minn. ("3M").

Any one of a number of processes may be employed to apply dry toner powder to a substrate to produce articles of the invention, including electrophotographic printing, screen printing, spray printing, and the like.

One preferred process is electrophotographic printing. A wide range of electrophotographic printers may be used to practice the present invention. One suitable printer is a 3M brand Multifunction Printer Model 1800 available from 3M. The Model 1800 printer was originally designed for automatic paper-feed, but may be operated on continuous webs with modifications which are within the skill of the art. The dry toner powders described herein are substituted for the toner usually used with the printer. The Model 1800 printer is a dual-mode printer. The printer is capable of printing from 35 mm aperture cards or microfilm. The printer also accepts digital information from a host computer (such as a Sun Microsystems Computer) in the form of raster files. Another suitable printer is a 3M brand Model 679 LBQ LASER PRINTER available from 3M. Preferably, such a printer is used in conjunction with a 3M brand Model 1811 CONTROLLER, also available from 3M. Both of these printers are capable of 200 dots per inch (dpi)(i.e. 79 dots per centimeter or 3.95 line pairs per millimeter) horizontal and vertical resolution and accept raster data files either from a raster-based host system (such as a Sun Microsystems Computer) or vector-based host system through a vector-to-raster converter.

A preferred computer program for defining license plate or other images which is written in the "C" computer language for use on a Sun Microsystems Computer is included on microfiche with this description. Standard computer programs for defining an image to be printed, in the form of raster files, are well known. However, many of these programs tend to suffer from a lack of speed in defining an image and/or tend to produce images with unacceptably "rough" edges when enlarged to sizes typically employed for an alpha numeric image on a license plate (i.e. about 6.0 cm in height). For example, Artisan™, a graphics printing program available, from Media Logic, Inc. of Santa Monica, Calif. and SunDraw™, a graphics printing program available from Sun Microsystems, Inc. of Mountain View, Calif. each provide one bit raster character files having only about 20% of the resolution of the program of this invention.

The preferred computer program is capable of utilizing the best resolution of the printer, that is 200 dots per inch (i.e. about 79 dots per centimeter or 3.95 dots per millimeter). The program also provides a number of "prompting screens" to a video monitor to enable an operator to compose and review an image for alphanumeric identification on a license plate or other substrate. The images are reviewed in reduced or downsized form to enable the image for an entire license plate or other substrate to be viewed on a video monitor.

The preferred computer program, included as microfiche herein, is described in detail in U.S. Pat. No. 5,085,918, col. 11, line 21, through col. 16, line 55, which portion of said patent is expressly incorporated herein by reference.

Computer programs useful in the present invention preferably include a number of program steps which, in combination, perform the major functions of the program. Specifically, the programs preferably include a function for making a character which may be used as an image or a portion of an image; a function for scanning in eye readable images; a function for adjusting contrast from grey scale to black and white; a function for adjusting scale or size of the image definition; a function for assembling the individual characters in a string;a function for merging an image definition with a second preferably repetitive image; and a function for sending the image definition to a printer.

If a charge control agent is included, it is recognized that colorants and adhesive binders can also affect the charging properties of the resulting dry toner powder. See, for example, H. T. Macholdt and A. Sieber, "Triboelectric Charging Properties of Organic Color Pigments," *J. Imaging Technology* 14:89–93 (1988).

The aggressively tacky PSA in adhesive layer 110 is selected as appropriate for the particular application, that is, depending upon the substrate, dry toner powder and protective layer composition, and use environment of the article. Based upon the teachings contained herein, one of skill in the appropriate chemical arts would be able to select the proper tacky PSA composition for a desired application to obtain appropriate image quality, within the constraints of cost efficiency. For example, the tacky PSA in adhesive layer 110 is preferably compatible with the non-tacky binder adhesive of the dry toner powder so that their combination does not produce "haziness" upon fusing. An acrylic-based tacky PSA is typically and preferably used in conjunction with a non-tacky acrylic dry toner powder binder adhesive, and this combination preferably laminated to an acrylic top-layer 104 of substrate 102. The charge control agent (if any) would preferably be a functionalized acrylic, and so on.

In embodiment 100 illustrated in FIG. 1, cover film 116 is intended as a permanent component of article 100, for example, as a protective covering for a license plate comprising a retroreflective substrate. In this and similar embodiments, cover film 116 will preferably be weatherable, resistant to oils and grease, exhaust fumes, and transparent. Suitable materials for a transparent, weatherable cover film include copolymers of ethylene and acrylic acid, polymethylmethacrylate and other acrylate-based polymers and copolymers. Illustrative examples of suitable cover films are disclosed in U.S. Pat. No. 4,664,966 (Bailey et al.), U.S. Pat. Nos. 4,767,659 (Bailey et al.), and 5,085,918, all incorporated herein by reference. Cover film 116 may be bonded to the remainder of signage article 100 by the inherent adhesive properties of the tacky PSA in adhesive layer 110. Alternatively, bonding may be provided or enchanced by physical techniques such as corona treatment or by an optional primer or tie layer (not shown) interposed between cover film 116 and adhesive layer 110.

In other embodiments, protective material 116 is not transparent. For example, when material 116 is intended to serve as a temporary protective sheeting, e.g. a removable protective liner of about 0.0013 cm to about 0.0076 cm thickness may be used. In such embodiments, protective material 116 is designed to provide temporary protection after manufacture and during shipping and storage. For such use, material 116 generally is made with score marks to allow material 116 to be easily peeled from article 100. A removable liner is useful when, for example, adhesive layer 110 of article 100 is to be applied to a transparent object (such as a vehicle window) and fused dry toner powder layer 108 is to be viewed through the object. When applied to a transparent object, substrate 102 effectively serves as a protective material.

One advantageous feature of the present invention is that substrate 102 may be selected from a wide variety of materials, which include, but are not limited to, metal, wood, fibrous sheeting such as paper and cardboard, polymeric sheeting, retroreflective sheeting and combinations of these materials. In many previously known applications, selection of such substrates would prove impractical due to the effects of thermal and/or pressure treatment experienced during the fusing process. In certain preferred embodiments of the present invention, substrate 102 comprises retroreflective elements in a polymeric sheeting, such as an encapsulated-lens sheeting (see, for example, U.S. Pat. Nos. 3,190,178; 4,025,159; 4,896,943; 5,064,272; and 5,066,098), enclosed-lens sheeting (see, for example, U.S. Pat. No. 2,407,680) or retroreflective-cube corner elements (see, for example, U.S. Pat. Nos. 3,684,348; 4,801,193; 4,895,428; and 4,938,563), the disclosures of which are incorporated herein by reference.

Fused dry toner layer 108 adheres to at least a portion of surface 104 of substrate 102 in the embodiment 100 of FIG. 1. Fused dry toner layer 108 preferably forms indicia such as alphanumeric characters, bar codes, graphics, logos or designs. Such articles may or may not be combined with additional components to create signage articles for informational and/or decorative purposes. Although fused dry toner layer 108 generally is discontinuous over the surface of the substrate, in some embodiments a continuous layer may be desired. For example, a street name sign may have a continuous colored background layer.

If substrate 102 is a retroreflective sheeting, a signage article may be used for traffic control materials, retroreflective and non-retroreflective vehicle markings, retroreflective garments, indoor/outdoor labeling products, frangible security stickers, product authentication materials, inventory labeling and control products, identification systems, or license plates. Alternatively, if substrate 102 is a fibrous sheeting, a signage article may be used for shipping and storage containers, store display packages, documents and the like.

A preferred inventive method for producing a signage article of this invention comprises the steps of applying dry toner powder composition to at least a portion of a first substrate surface, followed by laminating a transparent protective sheeting to the image precursor bearing surface. The protective sheeting comprises an inner tacky PSA adhesive layer and an outer cover film, and lamination results when the tacky PSA adhesive layer contacts (with light pressure) the dry toner powder and fuses the dry toner powder. In an alternate second inventive method, the surfaces to which the dry toner powder and the tacky PSA adhesive layer are applied are reversed, i.e., dry toner powder is applied to a cover layer, and the dry toner powder-bearing cover layer is laminated to a substrate having a tacky PSA adhesive layer on its surface.

Figure 2:
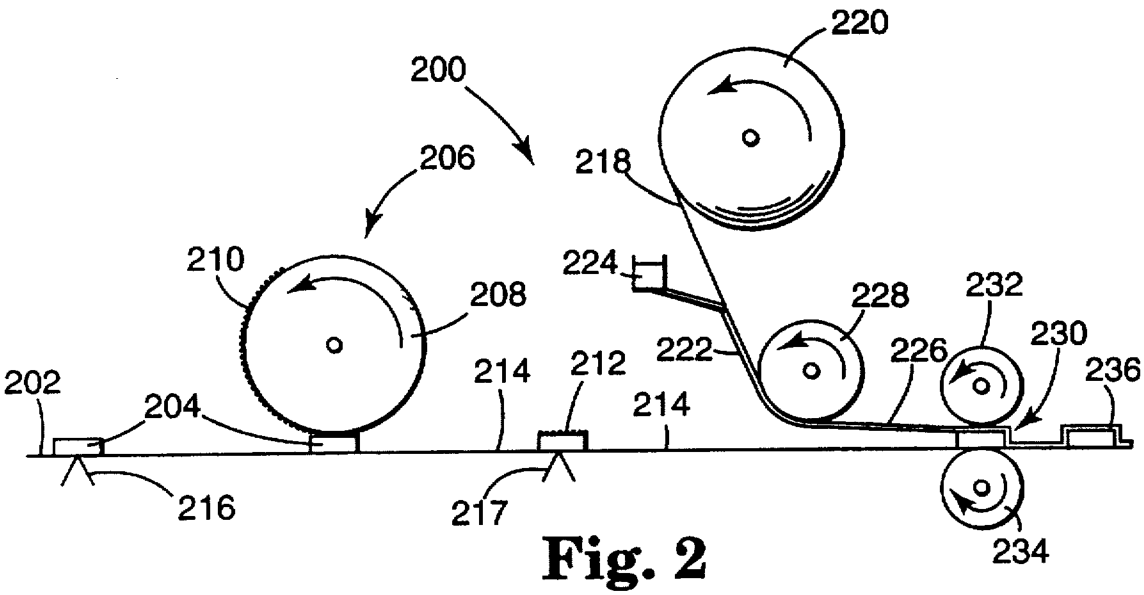
FIG. 2 is a schematic diagram of a method of making the articles of the invention making use of embossed substrates.

An embodiment of a method for producing a signage article according to the present invention is illustrated in FIG. 2. In method 200, substrate 202 is provided with raised portions 204 embossed into substrate 202. A station 206 applies dry toner powder obtained from a reservoir (not shown) to raised portions 204. Station 206 comprises a rotating drum 208 carrying a layer 210 of dry toner powder. Rotating drum 208, which may be, for example, a hard rubber roller, contacts or nearly contacts raised portions 204 of substrate 202. The contact or near contact between the rotating drum 208 and raised portion 204 allows transfer of at least a portion of dry toner powder layer 210 onto raised portion 204 to form an image layer 212, without transferring dry toner powder onto non-raised portions 214 of substrate 202. Optionally, transfer of dry toner powder may be facilitated by warming substrate 202 with a heat element 216 to a temperature above room temperature, but below a temperature which would have a degradative effect on the substrate or component of the substrate. Such temperature would typically be less than about 125° C..

Next, a transparent cover film 218 is provided from roll 220. Tacky adhesive precursor 222 comprising a tacky PSA and a volatile organic solvent is applied from a reservoir 224 to cover film 218 to form transparent protective sheeting 226. Solvent is evaporated, and a control roller 228 guides protective sheeting 226 into close proximity to the image-bearing substrate 202 at a nip 230 that is formed by rollers 232 and 234. Sufficient pressure is applied at nip 230 to laminate protective sheeting 226, tacky adhesive side down, to substrate 202, yielding signage article 236 having fused dry toner powder thereon. Sufficient pressure for laminating substrate 202 and protective sheeting 226 will vary, depending upon the substrate, PSA and cover film materials used. For a substrate comprising retroreflective sheeting having a vinyl protective layer and using a tacky acrylic PSA, the pressure at nip 230 typically ranges from about 690 kPa (100 psi) to about 1,380 kPa (200 psi) when the temperature is about 25° C., and the speed through the nip is about 1 to 100 meters/min, with low speeds being generally used with low nip pressure, and high speeds generally used with high nip pressure. Lamination of sheeting 226 to substrate 202 also may be carded out by stamping or other similar processes. Alternatively, protective sheeting 226 can be supplied with a removable protective liner disposed on the tacky PSA adhesive layer side. The liner is peeled away from the tacky adhesive layer side before sheeting 226 is brought into proximity with image-bearing substrate 202 at nip 230.

Substrate 202 may be provided as a continuous web or as discrete sheets. If provided as a continuous web, the web can be cut to the appropriate size after application of the protective covering film to yield finished articles. If the substrate is provided in discrete sheets, the cover film can similarly be provided and laminated to the substrate as discrete sheets.

If desired, substrate 202 may optionally be treated after applying dry toner powder but before application of tacky adhesive in order to diminish the physical shifting of the dry toner powder and to maintain the desired edge definition in image layer 212. Such treatment may be, for example, passage through a nip or past a heating element 217, illustrated in FIG. 2, to a temperature less than about 150° C., or using static charge to hold the dry toner powder in place until application of the tacky PSA coated protective covering.

Figure 3:
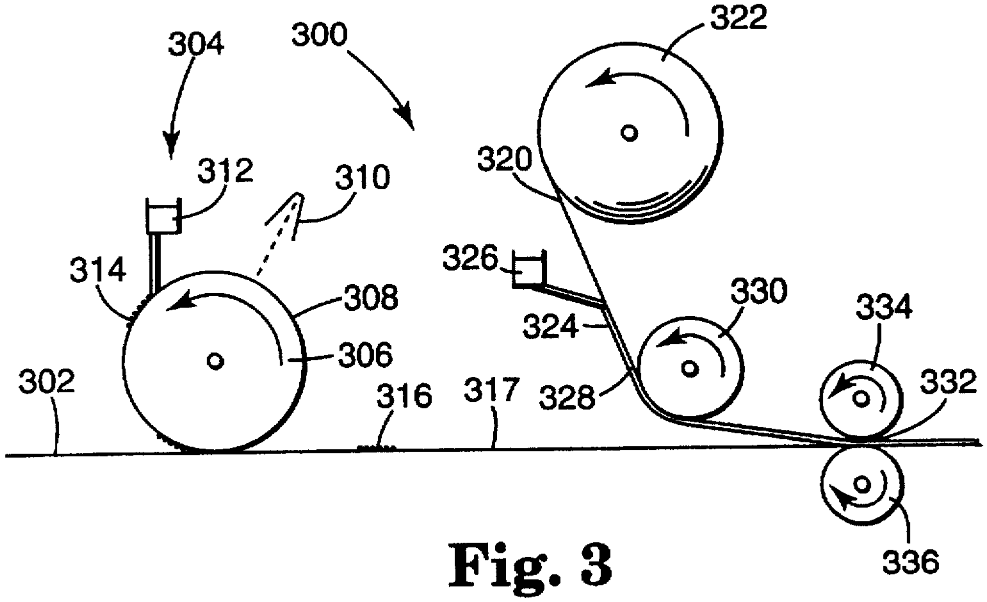
FIG. 3 is a schematic diagram of a method of making the articles of the invention using a smooth substrate where the image is printed onto the substrate.

An alternative embodiment of a method for producing an article is shown in FIG. 3, in which the substrate is not embossed. Method 300 comprises the step of applying dry toner powder to the surface of substrate 302, using station 304. Station 304 is comprised of laser imaging device 310 and rotating drum 306 having a reusable surface 308 that is initially electrostatically charged. The electrostatic charge on surface 308 is altered by laser imaging device 310 to form a latent image on surface 308, which then accepts dry toner powder from reservoir 312 to form a layer of dry toner powder 314 on at least a portion of surface 308, arranged in a pattern corresponding to the image defined by laser imaging device 310.

Dry toner powder layer 314 carried upon surface 308 is brought into contact or near contact with substrate 302 and transferred to the surface thereof to produce a dry toner powder-bearing substrate 317. The transferred dry toner powder preferably forms an image layer 316 on the surface of substrate 302. Reusable surface 308 is subsequently used in transferring new images to other portions of substrate 302 or to new substrates.

Next, cover film 320 is provided from a roll 322. A tacky adhesive precursor layer 324 comprising a tacky PSA and solvent carrier is applied from a reservoir 326 to cover film 320 to form transparent protective sheeting 328, the solvent being evaporated. A control roller 330 guides sheeting 328 into close proximity to dry toner powder-bearing substrate 317 at a nip 332 that is formed by two rollers 334 and 336. Nip 332 applies sufficient pressure to attach cover film 320 to substrate 302 and fuse the dry toner powder. When the substrate is a retroreflective sheeting havig a vinyl protective layer and the dry toner powder binding adhesive is acrylic, as well as the tacky PSA, the pressure between rollers preferably ranges from about 100 to about 200 KPa at 25° C. at a web speed of about 1–100 meters/min, as previously mentioned. As in method 200, cover sheet material can be provided with the tacky adhesive layer already applied and protected by a removable protective liner. The substrate and the cover film can be supplied as continuous webs or as discrete sheets.

Figure 4:
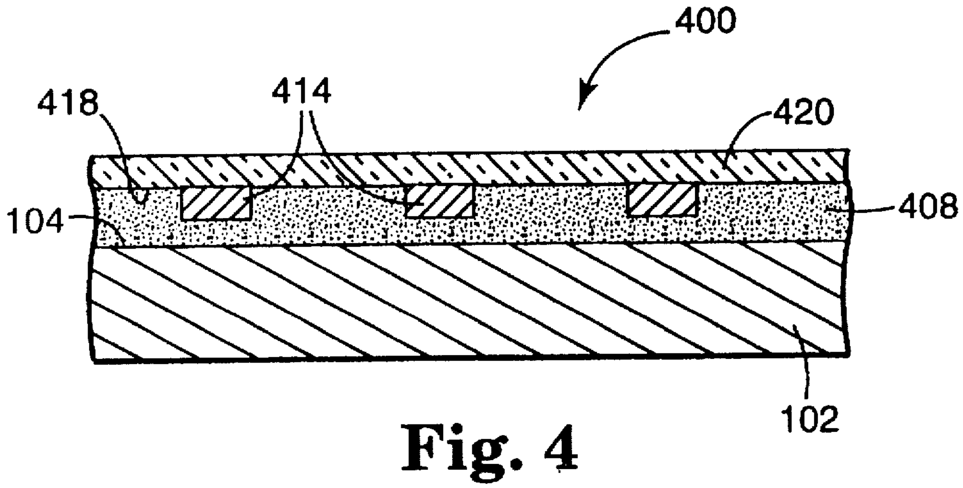
FIG. 4 is a cross section view (enlarged) of another signage article embodiment of the invention.

A schematic cross section view (enlarged) of a second embodiment of a signage article is illustrated in FIG. 4. Signage article 400 comprises substrate 102, adhered by a tacky adhesive layer 408 comprising a tacky PSA to a transparent cover film 420, with a fused dry toner powder layer 414. Tacky adhesive layer 408 is attached to substrate surface 104, and is substantially continuously bonded to surface 418 of transparent cover film 420, except for those portions that are adjacent to layer 414. Fused dry toner powder layer 414 is at least partially solubilized or wetted by PSA in tacky adhesive layer 408. Layer 414 comprises fused dry toner powder that has been applied to surface 418 of film 420 and is fusibly admixed with the PSA in adhesive layer 408 within the boundaries defined by the application of the dry toner powder. In finished form, fused dry toner powder layer 414 preferably comprises indicia which is visible to an observer through transparent cover film 420.

A method for producing signage article 400 of FIG. 4 is illustrated schematically in FIG. 3 except that dry toner powder is applied by a rotating drum mechanism to a transparent cover film rather than the substrate, and a tacky adhesive layer is applied to a substrate rather than the transparent cover film.

In the methods illustrated in FIGS. 2 and 3, optional processing steps may include adhesion promoting steps such as chemical and/or mechanical treatment of surfaces to increase adhesion, such as mechanical roughing, corona treatment, and or chemical priming. Corona treatment of films is a well-known technique, and is described generally in Cramm, R. H., and Bibee, D. V., *The Theory and Practice of Corona Treatment for Improving Adhesion*, TAPPI, Vol. 65, No. 8, pp 75–78 (August, 1982). Examples of chemical primers for vinyl and polyethylene terephthalate films include crosslinked acrylic ester/acrylic acid copolymers disclosed in U.S. Pat. No. 3,578,622.

An advantage of the present invention is an increase in the types of substrates to which dry toner powder may be applied, in particular, substrates such as retroreflective sheetings that cannot withstand fusing of dry toner powder at high temperatures. Another advantage relates to the equipment used to produce articles of the invention. Costly and complicated equipment is no longer needed to fuse dry toner powder by heat. With less heating required, fewer and less costly safety devices are needed. Laminating equipment used to apply an adhesive layer in the present invention, such as rollers, stampers and the like, generally is less expensive and less prone to breakdown than equipment used to heat-fuse dry toner powder. Further, operating costs are reduced when practicing methods of the invention, since the diminished heating requirements for fusing dry toner powder also reduces energy expenditures. Because of lower investment costs, the articles and methods of the invention are suited for small, as well as large, production runs.

A further advantage relates to costs of stopping production of signage articles during a manufacturing cycle. Known methods of applying and fusing dry toner powder to a substrate may result in damage to the resulting signage articles when production must be stopped prior to completion of a manufacturing cycle. Such damage often results from the high temperatures typically used in fusing dry toner powder to a substrate. In contrast, articles produced according to methods of the invention do not have such temperature-related damage if production is stopped within a cycle, thus reducing waste.

The products resulting from the present invention are designed to be viewed by an observer. The ultimate usefulness of the invention will be at least partially determined by the quality of the image produced. The image quality of articles produced according to the present invention is as good or better than the image quality produced by conventional fusing techniques utilizing high temperatures and/or pressures. Articles made according to this invention have sharp edge definition, more image density, and less light scattering than similar articles having images fused by known fusing methods.

Another advantage relates to color development in articles of the invention. Such articles have better color development in that not only do such articles reflect more light, but colors appear more vivid and more intense than articles made by known fusing techniques. Articles according to the invention typically are preferred over articles produced by known methods because of the improved color development.

Therefore, the invention is not only important for enlarging the range of substrates that are suitable for printing and fusing dry toner powder thereupon, but it is also useful as an inexpensive and convenient procedure for producing very high quality images on many different substrates when a protective cover layer is desired.

EXAMPLES

Features and advantages of this invention are further illustrated in the following Examples. It is to be expressly understood, however, that while the Examples serve this purpose, the particular ingredients and amounts used as well as other conditions and details are not to be construed in a manner that would unduly limit the scope of this invention. All parts and percentages are by weight unless otherwise specified.

Example 1

Figure 5:
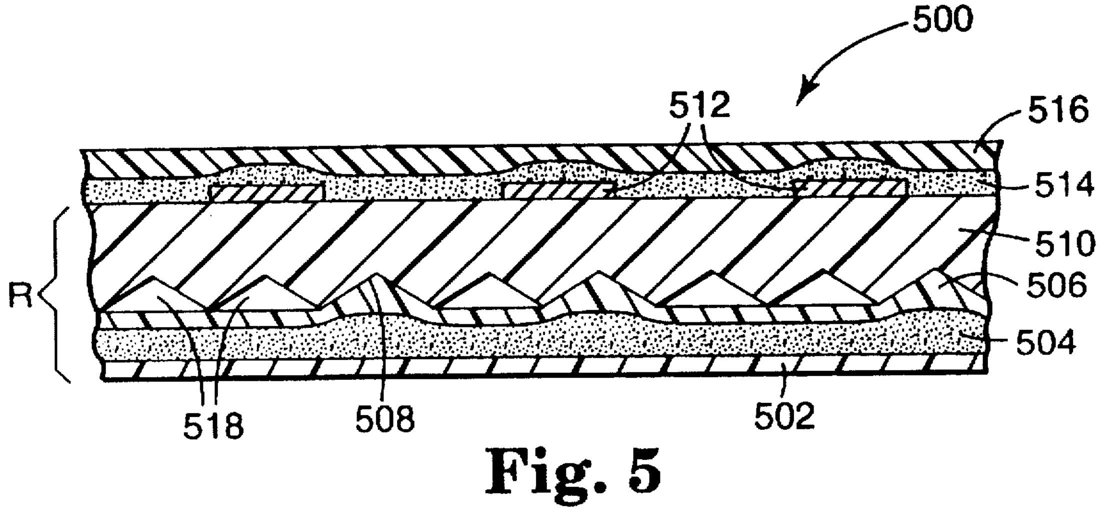
FIG. 5 is a cross section view (enlarged) of a particularly preferred signage article embodiment.

This example demonstrates a method of making a particularly preferred signage article of the invention, as illustrated in cross-section in FIG. 5.

Dry toner powder was prepared from a mixture comprising: 79 parts acrylic binder resin known under the trade designation ACRYLOID B-48 (Rohm & Haas Company); 8 parts of charge carrier known under the trade designation TRIBLOX PC-100 (DuPont Company); 13 parts of colorant known under the trade designation HELIOGEN BLUE K6911D (BASF Corporation); 0.2 part of colorant known under the trade designation PROJET 900 IMP (ICI Ltd.); and 0.1 part of a flow additive known under the trade designation CAB-O-SIL TS530 (Cabot Corporation). The components were mixed in a Baker Perkins gear drive variable speed twin screw extruder with a Haake record torque rheometer and extruded as a mixture at a temperature range between 150° C. to 225° C. The extruded mixture was hammermilled, and subsequently jet milled in a NPK supersonic jetmill known under the trade designation PJM IDS-2 from Nippon Pneumatic Manufacturing Company. The jet milled sample was then classified to collect material having a particle size ranging from 5 to 20 micrometers.

The dry toner powder was placed in the toner hopper of a Siemens Brand MODEL 2900 printer. The MODEL 2900 primer was originally designed for paper, but may be operated on continuous film-based webs with modifications that are within the skill of the art. The printer is capable of printing 240 dots per inch (94.5 dots per centimeter) horizontal and vertical resolution. The dry toner powder was applied by the printer to form the word SAMPLE, the characters defined by a computer program attached as microfiche herein. Each letter was about 7.3 centimeters in height and about 3 centimeters in width. The substrate for printing was a transparent cover film of ethylene acrylic acid (EAA) copolymer about 0.0061 cm thick, disposed on a removable polyethylene terephthalate (PET) carrier about 0.0025 cm thick.

After printing, the film was sent through a nip at 100° C., just sufficient to hold the dry toner powder in place. 3M Co. REFLECTO-LITE Brand retroreflective sheeting was coated on top of the reflective surface with a PSA precursor composition comprising a 95.5/4.5 weight ratio isooctyl acrylate/acrylic acid copolymer and a heptane:isopropanol solvent to a dried thickness of about 0.1 cm. The printed surface of the EAA film was brought in contact with the adhesive-coated retroreflective sheeting and the two materials were laminated with a squeeze roll applicator at ambient temperature (about 25° C.). The pressure between squeeze roll application rolls was about 40 PSIG (276 KPa), and the speed of the web through the nip was 1.2 meters/min. The carrier web was removed from the EAA film after lamination, resulting in a finished signage article 500 as illustrated in enlarged cross section in FIG. 5. Article 500 consists of a plastic liner 502; a tacky PSA layer 504 comprising a 95.5/4.5 weight ratio isooctyl acrylate/acrylic acid copolymer; another plastic film layer 506, known under the trade designation SCOTCHPACK, available from 3M Co. (a blend of polyethylene and polyethylene terephthalate) which is heat sealed at areas 508 to a portion of the concavities of a retroreflective sheeting 510 known under the trade designation DIAMOND GRADE, from 3M Co.; fused dry toner powder layer 512; tacky PSA layer 514 comprising the same tacky PSA as layer 504; and a transparent EAA copolymer cover film 516. The same article was subsequently put in the nip rollers and held at 25° C. for 15 minutes, 1 hour, and 15 hours at different letters of the word SAMPLE to determine the effect of longer compression times on image clarity. The image was more fully fused with increased time of compression, producing a deeper blue color.

It should be noted that the substrate R in FIG. 5 could also comprise any number of substrates, such as enclosed-lens retroreflective sheetings as disclosed in U.S. Pat. Nos. 5,085,918 and 4,664,966, incorporated by reference herein for their teaching of such retroreflective sheetings.

COMPARATIVE EXAMPLE

A top film of EAA copolymer was printed with dry toner powder as described in Example 1. The EAA film was laminated, image-bearing side down, to a retroreflective sheeting similar to Example 1, but without a tacky PSA layer on the surface. The dry toner powder was fused by using a conventional heat/pressure fusing technique using a fusing temperature of 150° C. and nip roll pressure of about 1 megaPascal.

Example 2

A variety of samples of signage articles were prepared according to the method of Examples 1 and the Comparative Example method at various temperatures. The resulting articles were evaluated according to a number of criteria: overall appearance, visual color, uniformity, edge definition, and image sharpness, among others. The relative rankings for the evaluated samples, along with their compositions and fusion treatments are reported in Table 1. In each case the speed of the web through the nip rollers was 2 meter/min.

In Table 1, the following designations are used:

"Acrylic CC"=cube-corner retroreflective sheeting having acrylic cube-corners.

"Alkyl-enclosed bead"=enclosed bead retroreflective sheeting having an alkyd binder.

"Acrylic-encapsulated bead"=encapsulated bead retroreflective sheeting having an acrylic binder.

"A"=a 95.5/4.5 weight ratio copolymer of isooctyl acrylate/acrylic acid.

"B"=a 90/10 weight ratio copolymer of isooctyl acrylate/acrylic acid.

"C"=made by mixing 50 parts VYNATHENE 902 (Quantum Chemicals); 24.8 parts PICCOTEX LC (Hercules); 25.2 parts WINGTACK 10 (Goodyear); and 100 parts toluene for two hours, coated using a knife coater and dried (air dry for 20 min., oven dried for 10 min at 70° C.).

"D"=made by mixing 44 parts KRATON G1657 (Shell Chemicals); 44.4 parts REGALREZ 1085 and 14.6 parts REGALREZ 1018 (both from Hercules Company); and 100 parts toluene for two hours, coated using a knife coater and dried (air dried for 20 min., oven dried for 10 min. at 70° C.).

Color Density=ranking based on a scale of 1 to 10, a relative comparison of samples within the same set (a set includes the same printed substrate). Attributes considered were overall appearance, visual color, uniformity, edge definition, image sharpness, and the like, as judged by an observer skilled in the art.

TABLE 1

| Sample | Substrate | PSA | Protective Layer | Pressure/Temp | Color Density | Ranking |
|---|---|---|---|---|---|---|
| 1 | Acrylic CC | none | EAA | 276 KPa/163° C. | 1.6 | 4 |
| 2 | Acrylic CC | none | EAA | 276 KPa/177° C. | 2.0 | 3 |
| 3 | Acrylic CC | none | EAA | 276 KPa/191° C. | 1.8 | 3 |

TABLE 1-continued

| Sample | Substrate | PSA | Protective Layer | Pressure/Temp | Color Density | Ranking |
|---|---|---|---|---|---|---|
| 4 | Acrylic CC | none | EAA | 276 KPa/202° C. | 2.0 | 2 |
| 5 | Acrylic CC | A | EAA | 276 KPa/25° C. | 2.3 | 1 |
| 6 | Alkyd-enclosed bead | none | EAA | 276 KPa/163° C. | 1.7 | 7 |
| 7 | Alkyd-enclosed bead | A | EAA | 276 KPa/66° C. | 1.6 | 2 |
| 8 | Alkyd-enclosed bead | A | EAA | 276 KPa/88° C. | 1.6 | 4 |
| 9 | Alkyd-enclosed bead | C | EAA | 276 KPa/25° C. | 1.7 | 3 |
| 10 | Alkyd-enclosed bead | D | EAA | 276 KPa/25° C. | 1.7 | 5 |
| 11 | Alkyd-enclosed bead | A | EAA | 276 KPa/25° C. | 1.6 | 1 |
| 12 | Alkyd-enclosed bead | B | EAA | 276 KPa/25° C. | 1.7 | 6 |
| 13 | Acyrlic-encapsulated bead | none | EAA | 276 KPa/149° C. | 1.8 | 2 |
| 14 | Acyrlic-encapsulated bead | none | EAA | — | — | — |
| 15 | Acyrlic-encapsulated bead | A | EAA | 276 KPa/25° C. | 2.1 | 1 |

The density and the overall print quality of the images produced in accordance with the invention were substantially better than the comparative examples where no tacky PSA was used to fuse the dry toner powder.

Although the present invention has been described with reference to the preferred embodiments, workers skilled in the art will recognize that changes may be made in form and detail without departing from the scope of the appended claims.

What is claimed is:

1. A signage article comprising:

a) a first substrate having first and second major surfaces;

b) fused dry toner powder adhered to the first surface of the first substrate, the fused dry toner powder comprising a colorant and a binder, the binder comprising a first adhesive that is non-tacky at about 25° C.; and c) a second substrate adhered by an adhesive layer to the fused dry toner powder and first surface of the first substrate, the adhesive layer comprising a second adhesive that is transparent and tacky at 25° C., at least one of the first and second substrates being transparent.

2. Article in accordance with claim 1 wherein the fused dry toner powder is in the form of alphanumeric symbols.

3. Article in accordance with claim 1 wherein the first substrate is selected from the group consisting of metal, wood, plastic, fibrous sheeting, retroreflective sheeting, and combinations thereof, and the second substrate is transparent.

4. Article in accordance with claim 3 wherein the fibrous sheeting is paper or cardboard.

5. Article in accordance with claim 3 wherein the retroreflective sheeting comprises retroreflective cube-corner elements.

6. Article in accordance with claim 3 wherein the first substrate is selected from the group consisting of encapsulated-lens retroreflective sheeting and enclosed-lens retroreflective sheeting.

7. Article in accordance with claim 1 wherein the first adhesive is selected from the group consisting of polymers in the general classes of polyesters, epoxies, polyalkylacrylates, polyalkylmethacrylates, polyurethanes, cellulose esters, polycarbonates, polyolefins, polyvinyl acetals, fluorine-containing polymers, ionomers, ionomeric copolymers and copolymers of styrene with n-butylmethacrylate, n-butylacrylate, butadiene and copolymers of ethylene or propylene and vinylacetate, acrylic acid or methacrylic acid.

8. Article in accordance with claim 1 wherein the second adhesive is selected from the group consisting of alkylacrylate polymers and copolymers; copolymers of alkylacrylates with acrylic acid; terpolymers of alkylacrylates, acrylic acid, and vinyl-lactates; vinyl ether polymers and copolymers; polyisoalkylenes; polyalkyldienes; alkyldiene-styrene copolymers; styrene-isoprene-styrene block copolymers; polydialkylsiloxanes; polyalkylphenylsiloxanes; natural rubbers; synthetic rubbers; chlorinated rubbers; latex crepe; rosin; cumarone resins; alkyd polymers; and polyacrylate esters and mixtures thereof.

9. A signage article comprising:

(a) a liner;

(b) a first adhesive layer having first and second major surfaces, the first surface removably adhered to the liner;

(c) a plastic film layer having first and second major surfaces, the first major surface adhered to the second major surface of the adhesive layer;

(d) a retroreflective layer having first and second surfaces, the first surface bonded to the second major surface of the film layer;

(e) a plurality of areas of fused dry toner powder adhered to the second surface of the retroreflective layer, the fused dry toner powder comprising a colorant and a binder, the binder comprising a first adhesive that is non-tacky at about 25° C.; and (f) a second adhesive layer adhered to the fused dry toner powder and second surface of the retroreflective layer, the second adhesive layer being transparent and tacky at 25° C.

10. Article in accordance with claim 9 wherein the first surface of the retroreflective layer is defined by a plurality of concavities, a first portion of the concavities filled with and adhered to the second major surface of the plastic film layer, a second portion of the concavities not filled with or adhered to the second major surface of the plastic film layer, the second surface of the retroreflective layer being substantially smooth.

11. Article in accordance with claim 10 wherein the concavities of the retroreflective layer are defined by cube-corner elements.

12. Article in accordance with claim 10 wherein the retroreflective layer comprises a laminate of polymethylmethacrylate sheeting and polycarbonate layer, the polymethylmethacrylate sheeting forming the smooth surface, the polycarbonate layer forming the plurality of concavities.

13. Article in accordance with claim 9 wherein said retroreflective layer is selected from the group consisting of enclosed-lens retroreflective sheeting and encapsulated-lens retroreflective sheeting.

14. Article in accordance with claim 9 wherein the first adhesive layer further comprises the second adhesive.

15. Article in accordance with claim 14 wherein the first and second adhesive layers comprise a tacky copolymer of a major portion of isooctyl acrylate and a minor portion of acrylic acid, and wherein the first adhesive is a non-tacky acrylate.

16. Article in accordance with claim 15 wherein the tacky copolymer comprises about 95.5 weight percent of isooctyl acrylate and about 4.5 weight percent of acrylic acid.

17. Article in accordance with claim 15 wherein the article further comprises a transparent protective layer adhered by the second adhesive layer to the fused dry toner powder and the second surface of the retroreflective layer wherein the transparent protective layer comprises a copolymer of ethylene and acrylic acid.

18. The signage article of claim 9, wherein said article further comprises a transparent protective layer adhered to the fused dry toner powder and second surface of the retroreflective layer by said second adhesive layer.

* * * * *

UNITED STATES PATENT AND TRADEMARK OFFICE

CERTIFICATE OF CORRECTION

PATENT NO. : 5,725,935

DATED : March 10, 1998

INVENTOR(S) : J. Sundar Rajan

It is certified that error appears in the above-indentified patent and that said Letters Patent is hereby corrected as shown below:

Title page, [56] References Cited - U.S. Patent Document insert --5,071,728 12/1991 Watts--.

Signed and Sealed this

Twenty-fourth Day of August, 1999

Attest:

Q. TODD DICKINSON

*Attesting Officer* *Acting Commissioner of Patents and Trademarks*